United States Patent

Boire et al.

Patent Number: 5,514,454
Date of Patent: May 7, 1996

[54] TRANSPARENT SUBSTRATE PROVIDED WITH A METAL NITRIDE LAYER

[75] Inventors: Philippe Boire; Pierre Balian, both of Paris, France

[73] Assignee: Saint-Gobain Vitrage, Courbevoie, France

[21] Appl. No.: 333,302

[22] Filed: Nov. 1, 1994

[30] Foreign Application Priority Data

Nov. 2, 1993 [FR] France ................... 93 13023

[51] Int. Cl.$^6$ .................... B32B 17/06
[52] U.S. Cl. ................ 428/216; 359/359; 359/580; 359/586; 359/589; 428/432; 428/698; 428/701; 428/702; 428/913
[58] Field of Search ................. 428/698, 469, 428/216, 432, 433, 913, 701, 702; 359/359, 580, 586, 589

[56] References Cited

U.S. PATENT DOCUMENTS 5,091,244  2/1992  Biornard ................. 428/216

FOREIGN PATENT DOCUMENTS

| | | |
|---|---|---|
| 239280 | 9/1987 | European Pat. Off. . |
| 0530676 | 3/1993 | European Pat. Off. . |
| 64-5930 | 1/1989 | Japan . |
| WO90/09883 | 9/1990 | WIPO . |

OTHER PUBLICATIONS

Chemical Abstracts, vol. 116, No. 16, Apr. 20, 1992, AN 157366k, p. 347, JP-A-3 275 533, Dec. 6, 1991.

Chemical Abstracts, vol. 115, No. 4, Jul. 29, 1991, AN 34179y, p. 300, JP-A-2 307 843, Dec. 21, 1990.

Database WPI, Derwent Publications Ltd., AN 92-040589, JP-A-2 307 844, Dec. 21, 1990.

*Primary Examiner*—Archene Turner
*Attorney, Agent, or Firm*—Oblon, Spivak, McClelland, Maier, & Neustadt

[57] ABSTRACT

The invention relates to a transparent substrate (1), more particularly of glass, surmounted by a metal nitride layer (3) for filtering solar radiation, characterized in that with a view to protecting said metal nitride layer particularly against high temperature oxidation, said layer (3) is surmounted by a pyrolyzed, metal oxide layer (4), whose metal has an oxide formation standard free enthalpy value $\Delta G°$ equal to or below $\Delta G°$ of the metal of the nitride layer (3) at a given temperature.

24 Claims, 1 Drawing Sheet

TRANSPARENT SUBSTRATE PROVIDED WITH A METAL NITRIDE LAYER

BACKGROUND OF THE INVENTION

1. Field of the Invention

The invention relates to a transparent substrate, particularly of glass, which is provided with a metal nitride layer, particularly with the aim of producing glazings having protection against solar radiation.

2. Discussion of the Background

Glazings provided with a metal nitride layer make it possible to reduce the heat resulting from solar radiation, because metal nitride layers, e.g. of titanium nitride, are able to partly filter the same by absorption and reflection.

Different methods exist for depositing metal nitride layers on substrates, such as in particular those using a vacuum of the cathode sputtering type assisted by a magnetic field. Although these methods are effective they are expensive with respect to the equipment required and are unable to operate continuously on a float glass ribbon.

These are also so-called pyrolysis methods, which consist of projecting onto a substrate, raised to a high temperature, nitrogen precursors and metal precursors which, when in contact with one another, decompose on the substrate leaving behind a metal nitride film. These methods are simpler to carry out and in particular can be continuously used on the float glass ribbon.

Thus, EP-B-128,169 discloses a process for the deposition of titanium nitride TiN layers by vapor phase pyrolysis, also known as chemical vapor deposition or CVD, from a titanium precursor, such as titanium tetrachloride, and a nitrogen precursor, in the form of ammonia. However, although the deposition of a single nitride layer gives the substrate sun-shielding properties, it scarcely offers any flexibility with regards to the choice of colors. Moreover, the unprotected nitride layer may oxidize on the production line or subsequently, during a heat treatment on the substrate such as bending, tempering or annealing. Thus, a partly oxidized nitride layer undergoes significant deteriorations of its properties and visual appearance.

It is for this reason that EP-B-239,280 recommends depositing on the nitride layer, a second layer for protecting it and constituted by an oxide of tin, silicon or aluminum. However, the degree of resistance to oxidation obtained in this way by the nitride layer is closely dependent on the intrinsic properties of the protective layer, particularly the choice of the metal forming the oxide, as well as its thickness and these properties will also influence the optical appearance, particularly in reflection, of the carrying substrate.

The object of the invention is therefore to improve upon the protection, particularly against oxidation, of a metal nitride layer deposited on a transparent substrate, without said improvement being detrimental to its optical appearance.

SUMMARY OF THE INVENTION

The invention therefore relates to a transparent substrate, particularly of glass, surmounted by a metal nitride layer for filtering solar radiation, said nitride layer being itself surmounted by a metal oxide layer, whose majority metal has an oxide formation standard free enthalpy value $\Delta G°$ less than or equal to the standard enthalpy value, $\Delta G°$ of the metal of the metal nitride layer at a given temperature, particularly approximately 600° C. This oxide layer protects the nitride layer against any oxidation phenomenon, particularly at high temperature, during heat treatments carried out on the carrying substrates such as annealing, bending or tempering.

Thus, surprisingly, it is by the combination of the choice of a pyrolysis method for carrying out the deposition of the oxide protective layer and the choice of the metal of said oxide as a function of that of the nitride (by comparison of their respective $\Delta G°$ values) that the nitride layer is effectively protected against the oxidation which would impair its properties both optically and from the energy standpoint.

Thus, the inventors have attempted to summarize the reasons why a nitride layer, even surmounted by a protective layer, would be subject to oxidation at high temperatures. There are numerous reasons. One of them probably results from the intrinsic characteristics of the protective layer and in particular its density degree or porosity. Thus, a porous layer would facilitate the diffusion of oxygen from the external atmosphere through its thickness to the underlying nitride layer. If it was attempted to compensate for a certain porosity by increasing the thickness of the protective layer, there would be a risk of significantly reducing the visual appearance, particularly in reflection, of the carrier substrate.

The deposition of the protective oxide layer is by pyrolysis, i.e., a method performed at high temperature (generally 500° to 650° or 700° C.) which ensures that the latter has a high density and also an excellent adhesion to the underlying layer.

Thus, oxygen diffusion through such a non-porous layer is greatly reduced, even if the layer is relatively thin.

Another reason for the nitride layer oxidizing is due to the protective layer itself. The oxide from which it is formed can have more or less of a marked tendency at high temperatures to react chemically with the metal nitride at the interface between the two layers, which leads to the transformation, in the vicinity of said interface, of the oxide into substoichiometric oxide in oxygen and the nitride into partly oxidized nitride $TiN_xO_y$.

However, on choosing the metal of the oxide in such a way that it has a $\Delta G°$ value at a high temperature, particularly about 600° C., which is equal to or below that of the metal of the nitride, the protective metal oxide is thermodynamically stable relative to the nitride and the oxidation of the latter is decelerated.

Therefore the solution according to the invention combines the esthetics and integrity of the functional nitride layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
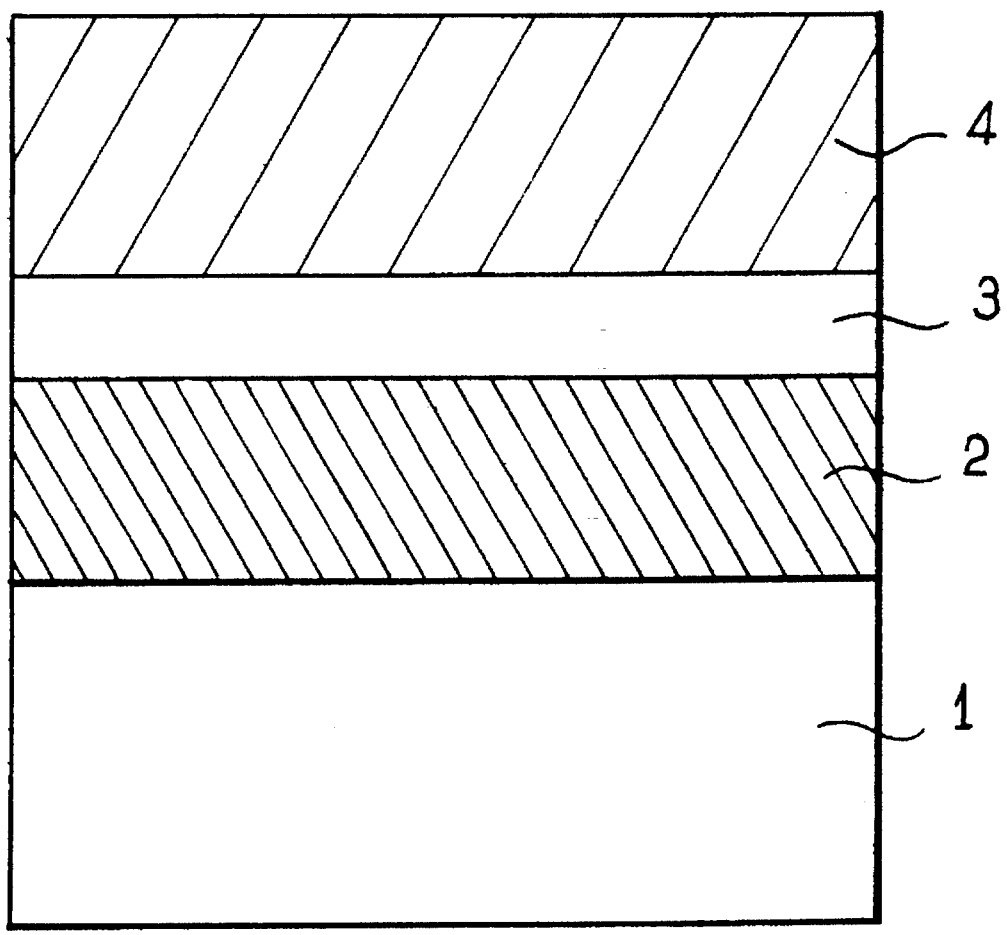
FIG. 1 describes a transparent substrate 1, covered with three layers 2, 3 and 4.

Conventional metal nitrides known to those of ordinary skill in the art, to protect against the effects of solar radiation may be used. Preferably, the metal of the nitride layer is largely titanium, knowing on the one hand that TiN layers offer an effective protection against solar radiation and on the other they can be easily deposited particularly by vapor phase pyrolysis. This method, which is applicable to a continuous float glass ribbon process, more particularly uses as precursors a titanium halide and a nitrogen derivative such as ammonia and/or an amine, following e.g. the teaching of French patent application 93- 09916 filed on Aug. 12, 1993 and corresponding to European patent application 94-401845.1 filed on Aug. 11, 1994.

In order that the nitride layer adequately reduces the energy transmission of the carrier substrate, which is particularly made from glass, without the latter excessively losing its transparency character, the nitride layer's geometrical thickness is preferably $\leq 80$ nm, particularly between 4 and 80 nm, especially between 10 and 60 nm and e.g. between 15 and 35 nm.

Preferably, according to the invention, the metal of the metal oxide layer is largely titanium. A metal oxide largely of titanium preferably conprises >50 wt. % $TiO_2$, more preferably >80 wt. % $TiO_2$, even more preferably >90 wt. % $TiO_2$. It can be $TiO_2$ (but it would also be possible to use alumina or zirconia for reasons given hereinafter).

The geometrical thickness of the metal oxide layer is advantageously between 10 and 120 nm, preferably < 90 nm and in particular between 10 and 30 nm, which is sufficient for protecting the nitride layer against oxidation and additionally against chemical or mechanical action.

It should be noted that a preferred embodiment of the invention consists of providing a substrate/TiN/$TiO_2$ stack. Thus, by choosing the same metal for forming the nitride layer and the protective oxide, there is an excellent compatibility of the two layers, particularly with regards to mutual adhesion. Moreover, even if it was found that a minimum proportion of oxygen passed from the oxide layer to the nitride layer bringing about the surface oxidation thereof, this would only tend to make $TiO_2$ disappear in the oxide layer, said reaction being quantitatively negligible, non-detectable and having in general a zero chemical balance.

However, on using TiN as the nitride layer, knowing that titanium has an oxidation $\Delta G°$ value of approximately 190 kcal/mole ($O_2$) at 600° C., the metal of the oxide layer can also be advantageously chosen, as mentioned hereinbefore, from among zirconium and aluminum which have a $\Delta G°$ value of at the most 190 kcal/mole ($O_2$) at this temperature. Thus, the $\Delta G°$ value at 600° C. of zirconium is approximately 221 kcal/mole ($O_2$) and that of aluminum is very close to that of zirconium.

Thus, one of the interests of choosing titanium dioxide is that it is easy to deposit such a layer by a known pyrolysis procedure. Thus, it is possible to use a solid pyrolysis method with precursors in pulverulent form such as titanium acetyl acetonate, a tetra-alkyl titanate or $Ti(OCH_3)_4$, as described in EP-B-75,516. It is also possible to use a liquid pyrolysis procedure with precursors dissolved or diluted in organic solvents and which can be titanium acetyl acetonate and/or titanium isopropylate, or an alkoxide such as titanium tetraoctylene glycol, all known from FR-B-2,664,259. In addition, there is vapor phase pyrolysis from halides of the $TiCl_4$ type and an oxygen source such as $H_2O$, $CO_2$, air or alcohol or the ethanol type.

It is also possible to deposit a zirconium dioxide $ZrO_2$ layer by pyrolysis, particularly using the solid method with, as the pulverulent precursor, zirconium acetyl acetonate, or alternatively by the liquid or vapor procedures.

In the same way, the aluminum can be deposited by liquid or solid pyrolysis using precursors having in particular an alkoxide or β-diketone function and e.g. such as aluminum triisopropylate, aluminum tri-n-butylate, aluminum tri-ter-butylate, aluminum tri-ethylate or aluminum acetyl acetonate or to use a vapor procedure.

It is also advantageously possible to have a third layer in the stack according to the invention and which is positioned between the substrate and the nitride layer and is based on a dielectric material. Its refractive index is preferably between 1.4 and 2, more particularly between 1.6 and 1.9. Its geometrical thickness is preferably <100 nm, particularly approximately 40 to 90 nm. The preferred dielectric material for said third layer is based on $SiO_2$ and/or $SiO_xC_y$, can be deposited by conventional methods such as by vapor phase pyrolysis of silicon precursors.

The inventors have discovered that the presence of this intermediate layer between the substrate and the nitride layer could significantly reinforce the oxidation resistance of the latter. While not wishing to be bound by any particular theory the explanation which has been advanced for this is that the heat treatments undergone by the substrate provided with the nitride layer, when sufficiently long and/or when reaching sufficiently high temperatures, would favor the migration of oxygen ions from the carrier substrate made from glass towards the nitride layer, which would thus have a tendency to oxidize, even when protected by an oxide overlayer on the surface opposite the substrate. A dielectric material layer, placed between the substrate and the nitride layer, would effectively block this diffusion and would thus prevent the nitride from oxidizing.

The most suitable material for fulfilling this barrier function with respect to oxygen ions during subsequent heat treatments is a dielectric based on $SiO_xC_y$ or $SiO_2$. However, such a layer can also be useful for serving as a barrier during the actual deposition of the nitride layer, particularly when it takes place by pyrolysis, especially on a float glass ribbon. This intermediate layer can also fulfill an optical function and in particular make it possible to adjust the appearance in reflection of the substrate, in conjunction with the protective oxide overlayer.

Thus, for more reliably protecting the nitride layer against oxidation, no matter what the type of heat treatment envisaged for the substrate, it is better not only to have the chemically inert, dense oxide overlayer as described hereinbefore, but also an underlayer serving as a barrier relative to the substrate. Everything depends on the precise nature of the envisaged heat treatment and the degree of oxidation resistance which it is wished to achieve for the nitride layer, said underlayer remaining optional.

It can also be possible to place on the metal oxide protective layer a so-called anti-reflection layer with a refractive index below 2 and particularly between 1.6 and 1.9. It is advantageously based on $SiO_2$ or $SiO_xC_y$. Having an essentially optical function, said layer preferably has a geometrical thickness below 200 nm, particularly between 20 and 150 nm and preferably between 40 and 70 nm. This layer with the low refractive index therefore advantageously reduces the light reflection value of the carrier substrate and is effective, particularly when the underlying metal oxide layer has a relatively high refractive index, e.g., exceeding 2.2, as is the case for titanium dioxide. It can in particular be deposited by vapor phase pyrolysis.

A preferred embodiment of the invention consequently consists of depositing on the nitride layer, a first layer based on $TiO_2$, and then a second layer based on $SiO_x C_y$, advantageously with the sum of the thicknesses of the two latter layers being equal to approximately 40 to 80 nm, particularly 50 to 75 nm, preferably with 10 nm of $TiO_2$. This makes it possible to reconcile the bendability/temperability and esthetic requirements. Thus, the protective $TiO_2$ thickness of at least 10 nm is adequate to bring about an optimum protection of the nitride against oxidation, whilst the choice of the $SiO_2$ layer with an appropriate thickness and index makes it possible to "erase" to a greater or lesser extent the bright appearance in reflection of the stack due to the use of a high index oxide such as titanium dioxide.

With regards to the production process, the simplest method is to provide the deposition of all the layers by pyrolysis. It is then possible to carry out the successive depositions in continuous manner on the glass ribbon of a float installation. Thus, the optional barrier underlayer and the nitride layer can e.g. be deposited by vapor phase pyrolysis in the enclosure of the float bath and the $TiO_2$-type oxide overlayer can be deposited either by vapor phase pyrolysis in the float bath enclosure, or by solid or liquid phase pyrolysis between the float glass enclosure and the lehr. Finally, the second overlayer of the $SiO_xC_y$ type can be deposited by vapor phase pyrolysis, particularly in the lehr.

The transparent substrate is preferably of glass in order to withstand the temperature imposed by the pyrolysis depositions. It is possible to use substrates made from conventional, clear soda-lime-silica glass, particularly that marketed by Saint Gobain Vitrage under the trade name FLANILUX. However, preference may be given to glass substances already having intrinsic thermal properties and which are able to reduce the energy transmission of the glazing incorporating them, e.g. by additions of particular compounds such as coloring oxides. Reference can be made to the range of colored glass substrates sold by Saint-Gobain Vitrage under the trade name PARSOL, which have various thermal properties and colors. Reference can also be made to the glasses described in patent application WO-93/07095 and French patent application 92/15537 of Dec. 23, 1992 in the name of Saint-Gobain Vitrage International. The use of glass substrates already having a certain functionality is very advantageous, because in this way it is possible to synergistically combine both the esthetic and thermal effects of the substrate on the one hand and the stack of thin layers on the other.

The covered substrates according to the invention are advantageously incorporated into solar protection glazings, particularly in monolithic, multiple or double glazings, more particularly those for use in buildings. In this case, the substrates according to the invention are placed in the double glazing, preferably in such a way that the stack of thin layers is located at face 2 once the glazing has been installed. (The faces of multiple glazings are normally numbered starting from the outermost face with respect to the room on which they are used). Thus, there is a combination of the thermal insulation effect of the intercalated gas layer and the filtering effect with respect to heat rays of the substrate covered with the stack of thin layers.

The thus formed double glazings can have a light transmission $T_L \leq 65\%$ and a light transmission/energy transmission $T_L/T_E$ ratio exceeding 1, particularly between 1.2 and 1.4 and e.g. approximately 1.3. From the performance standpoint, said glazings therefore form a good "solar filter", whilst maintaining a transparency level making them particularly suitable for use in buildings. The relatively high $T_L/T_E$ ratio proves that they are selective. The glazings also have a solar factor which can be below 0.5, which proves their very significant "anti-solar" effect. (It is pointed out that the solar factor of a glazing is the ratio between the total energy entering the room through said glazing and the incident solar energy).

The advantageous details and characteristics of the invention can be gathered from the following description of non-limitative embodiments with the aid of the attached FIG. 1 showing in section a substrate 1 covered with three layers 2, 3 and 4. (The proportions between the thicknesses of the different materials have not been respected so as to facilitate the understanding of the drawing.)

EXAMPLES 1 TO 4

Examples 1 to 3 relate to the deposition and a 6 mm thick substrate 1 of FLANILUX-type clear soda-lime-silica glass of a stack of thin layers successively comprising a $SiO_xC_y$ layer 2, a titanium nitride TiN layer 3 and a $TiO_2$ titanium dioxide layer 4. Example 4 is similar to the previous examples, but has no $SiO_xC_y$ layer 2.

The deposits were made in the following way:

The deposit of the $SiO_xC_y$ layer 2, when present, takes place by $SiH_4$ vapor phase pyrolysis in known manner in accordance with the teaching of EP-A-518,755.

The deposit of the TiN layer 3 takes place by vapor phase pyrolysis of $TiCl_4$ and ammonia according to EP-B-128,169, or $TiCl_4$ and amine according to French patent application 93 09916 filed on Aug. 12, 1993.

The deposit of the $TiO_2$ layer 4 takes place by liquid phase pyrolysis of a mixture of a titanium chelate (acetyl acetonate and titanium isopropylate) and a titanium alkoxide (titanium tetraoctylene glycol) in ethyl acetate, so that the ratio of the chelate and alkoxide concentrations expressed by weight of titanium is 2:2, the precursors and proportions being known from FR-B-2,664,259.

Table 1 gives the thickness value e in nanometers of layers 2 to 4 for each of the four example and it is pointed out that in the case of the $SiO_xC_y$ layer 2, its refractive index is designated r.i.

TABLE 1

|  | Example 1 | Example 2 | Example 3 | Example 4 |
|---|---|---|---|---|
| Layer 2 |  |  |  |  |
| e | 50 | 50 | 45 | — |
| r.i. | 1.9 | 1.9 | 1.7 |  |
| Layer 3 |  |  |  |  |
| e | 23 | 30 | 23 | 23 |
| Layer 4 |  |  |  |  |
| e | 30 | 30 | 85 | 85 |

For examples 1 to 3, the following table 2 gives the following spectrophotometric values: $T_L$ light transmission and $T_E$ energy transmission as a percent, the dimensionless $T_L/T_E$ ratio called selectivity, $R_L$ the external light reflection as a percentage. The values were obtained on a double glazing constituted by the substrate covered with three layers assembled on another, identical substrate, but not having a covering by means of a 12 nm thick gas, the layers being on face 2. The values are given with reference to the illuminant $D_{65}$.

TABLE 2

|        | Example 1 | Example 2 | Example 3 |
|--------|-----------|-----------|-----------|
| $T_L$  | 63        | 60        | 46        |
| $T_E$  | 47        | 43        | 41        |
| $T_L/T_E$ | 1.3    | 1.4       | 1.1       |
| $R_L$  | 13        | 13        | 28        |

Moreover, the covered substrates according to these examples, before being assembled to form a double glazing, underwent a heat treatment at more than 500° C. simulating tempering or bending. This type of treatment did not visually modify in a detectable manner the appearance of the substrates and the TiN layer retained in unchanged form, its reflection/absorption properties with respect to solar radiation.

Prior to assembly, the substrate according to Example 4 underwent two types of tests making it possible to evaluate the mechanical and chemical durability of the stack of thin layers covering the same.

The so-called Taber test is the mechanical test making it possible to evaluate the abrasion resistance of the layer. It is performed with the aid of wheels made from abrasive powder embedded in an elastomer. The machine is manufactured by Taber Instrument Corporation in the U.S.A. It is Model 174 "Standard Abrasion Tester" the wheels of type CS10F being charged with 500 grams. The layer undergoes 2000 rotations.

The chemical test known as the HCl test consists of immersing the covered substrate in an aqueous HCl solution having a concentration of 1 mole/liter and refluxed at 100° C. for 1 hour.

In both tests, evaluation takes place of the degree of deterioration of the layers on the one hand by the difference $T_L\text{-}T_{LO}$ between the light transmission values $T_L$ obtained at the end of the test and those at the beginning and on the other by the difference ($H_L\text{-}H_{LO}$) between the diffused light fraction values obtained at the end of the test and those at the beginning. These values, as a percentage, are given in the following table:

TABLE 3

| Example 4 | $T_L - T_{LO}$ | $H_L - H_{LO}$ |
|-----------|----------------|----------------|
| Taber test | 8%            | <2.5%          |
| HCl test   | 2%            | 0.75%          |

The following conclusions can be drawn from all of the above data.

The titanium dioxide overlayer 4 is very effective for protecting the underlying nitride layer 3, even if it has a relatively limited thickness. The choice for the formation of the oxide of a metal with a ΔG° value at 600° C. equal to that of the metal of the nitride (because it is here a question of the same metal, namely titanium) combines two advantages. The oxide has a high thermodynamic stability relative to the nitride, which very considerably reduces any risk of oxidation of the nitride by oxygen from the said oxide. In addition, even if a very limited proportion of oxygen leads to the surface oxidation of the TiN layer, the fact that the same metal is chosen for both layers would make said oxidation undetectable and non-prejudicial, the TiN possibly oxidized to $TiO_2$ at the interface between the two layers coinciding with the $TiO_2$ layer.

Moreover, the good results obtained in the mechanical and chemical durability tests indirectly prove the high density of the overlayer 4 and its strong adhesion to the underlying nitride layer 3, said density and said adhesion being obtained as a result of the deposition used, namely high temperature pyrolysis. The dense, non-porous nature of the oxide over layer thus prevents the oxygen from the external atmosphere from diffusing through the oxide overlayer in order to reach the nitride layer 3 and oxidize the same.

The optimum procedure is to deposit the oxide overlayer 4 following the deposition of the nitride layer 3, so that the latter does not have time to oxidize on the surface being covered and this is all the more marked when the nitride layer is deposited by pyrolysis on a very hot float glass ribbon which, on leaving the float bath enclosure, is in contact with ambient air.

It can be seen from examples 1 and 2 that the choice of the thickness of the nitride layer 3 makes it possible to modify the $T_L$ values and therefore the degree of transparency of the glazing, but the $T_L:T_E$ ratio remains roughly constant at approximately 1.3 to 1.4. This means that the stack of layers according to the invention makes it possible to obtain selective glazings, i.e., having relatively high $T_L:T_E$ ratios, no matter what the desired $T_L$ value.

A final point, deduced from the comparison of examples 1 and 3, is that the combined use of an underlayer 2 and an overlayer 4 on either side of the functional nitride layer 3 makes it possible to adjust the optical appearance of the glazing. Thus, according to example 1, the glazing has a $R_L$ value below 15% and therefore a non-bright, slightly reflecting reflection appearance, which is at present highly esteemed from the esthetic standpoint. However, according to example 3, it is also possible to choose a glazing with a higher $R_L$ by using a significantly thicker oxide overlayer 4. The presence of the underlayer 2 also blocks the migration of oxygen ions from the substrate 2 to the nitride layer 3, which could otherwise occur, particularly when the envisaged heat treatment of the bending or tempering type, takes place under conditions particularly suitable for nitride oxidation.

EXAMPLES 5 TO 8

These examples relate to deposition on clear glass substrates having the same characteristics as for examples 1 to 3, but covered with a slightly different stack eliminating the $SiO_xC_y$ underlayer 2 and adding an overlayer, not shown in FIG. 1 and also based on SiOC and surmounting the $TiO_2$ layer 4. Thus, on this occasion the stack is of the type glass/TiN/$TiO_2$/$SiO_xC_y$.

The TiN and $TiO_2$ layers are produced as hereinbefore. The $SiO_xC_y$ overlayer is obtained either by vapor phase pyrolysis from $SiH_4$ and ethylene, as known from EP-A-518,755, or from organo silicon precursors (such as tetraethyl orthosilicate, diethyl silane, hexamethyl disilane, hexamethyl disiloxane, octamethyl cyclotetrasiloxane, tetramethyl cyclotetrasiloxane, hexamethyl disilazane or tetramethyl silane), combined with an oxidizing gas such as $O_2$, $O_3$, water vapor or $N_2O$. The interest of using an organosilicone precursor rather than $SiH_4$ is particularly that it generally has a slightly higher decomposition temperature than $SiH_4$, i.e., around 480° C. for tetraethyl orthosilicate (TEOS). In the case of a deposit on a float line, it is thus possible to deposit the second overlayer in the lehr, the float glass ribbon then having the adequate temperature.

The deposition conditions of said layer are regulated in known manner so that it has a refractive index of approximately 1.7.

For each of the examples 5 to 8, the following table 4 gives the thickness values e in nanometers of each of the layers present.

TABLE 4

|  | e[TiN (3)] | e[TiO$_2$ (4)] | e[SiO$_x$C$_y$ overlayer] |
|---|---|---|---|
| Example 5 | 15 | 10 | 55 |
| Example 6 | 15 | 15 | 55 |
| Example 7 | 15 | 20 | 50 |
| Example 8 | 15 | 30 | 40 |

These substrates underwent a heat treatment at 500° C. simulating bending or tempering. Once again no significant modification was observed from the visual or thermal standpoint, which confirms that a 10 nm thick (example 5) overlayer of TiO$_2$ can be sufficient to bring an effective protection of the nitride against oxidation, due to its effective "shield" effect resulting more especially from its high density.

The substrates were then installed in double glazings under the same conditions as for examples 1 to 3.

For these four double glazings, table 5 gives the following photometric values $T_L$, $T_E$, the $T_L:T_E$ ratio, $R_L$ (same meanings as hereinbefore). It also mentions the dimensionless solar factor values FS, the dominant wavelength η d(t) and the color purity $P_e$(t) in transmission. It also gives the dominant wavelength η d(E) and the color purity $P_e$(R) of the external reflection $R_L$.

TABLE 5

|  | Example 5 | Example 6 | Example 7 | Example 8 |
|---|---|---|---|---|
| FS | 0.46 | — | 0.45 | 0 |
| $T_E$ | 37 | 37 | 38 | 36 |
| $T_n$ | 52 | 51 | 50 | 49 |
| $T_L/T_E$ | 1.40 | 1.38 | 1.32 | 1.36 |
| η d(t) | 499 | 498 | 498 | 507 |
| $P_e$ (t) | 1.7 | 1.7 | 1.6 | 1.0 |
| $R_L$ | 24 | 26 | 27 | 32 |
| η d(R) | 497 | 498 | 498 | 504 |
| $P_e$ ($R_e$) | 3.5 | 3.3 | 3.2 | 2.4 |

Therefore all these double glazings have a solar factor below 0.5 and a selectivity above 1.30. Thus, they give a good protection against heat rays from the sum without excessively sacrificing transparency.

It should also be noted that in transmission, the color is in the blue-green range, but in an extremely attenuated form, because the purity remains below 2.

In the same way, in external reflection, the glazings have a blue coloring which is esthetic and also very weak and attenuated, because its purity remains below 4. Thus, in all these examples, it has been possible to maintain constant the value of the sum of the thicknesses of the TiO$_2$ overlayer and the second SiOC overlayer and which is approximately 70 nm. It can be seen that the greater the thickness of the TiO$_2$ layer compared with that of the SiOC layer, the higher the $R_L$ value. Thus, by modifying the thicknesses of these two layers, it is possible to adjust the more or less reflecting appearance of the glazings seen from the outside, knowing that 10 nm of TiO$_2$ can be sufficient to protect the underlying nitride, if the layer is deposited under conditions allowing the obtaining of a high density and a high adhesion thereof.

EXAMPLES 9 TO 18

These examples relate to the deposition of a stack of three layers TiN/TiO$_2$/SiO$_x$C$_y$, obtained as in examples 5 to 8, but on four types of glass substrates, which themselves have a reduced energy transmission. The first three are marketed by Saint-Gobain Vitrage under the names PARSOL bronze, PARSOL grey and PARSOL green. The fourth is a blue-colored glass, like that described in patent application WO-93/07095.

Table 6 gives the characteristics of these four monolithic glasses of thickness 6 nm, compared with the PLANILUX clear glass used in the previous examples.

TABLE 6

| Blank glass | Clear | Bronze | Grey | Green | Blue |
|---|---|---|---|---|---|
| FS | 0.86 | 0.61 | 0.58 | 0.60 | 0.56 |
| $T_E$ | 83 | 50 | 45 | 48 | 42 |
| $T_L$ | 90 | 49 | 41 | 72 | 76 |
| $T_L/T_E$ | 1.08 | 0.99 | 0.92 | 1.49 | 1.81 |
| η d(t) | 509 | 584 | 473 | 494 | 491 |
| $P_e$ (t) | 0.1 | 9 | 2 | 5 | 7 |
| $R_L$ | 8 | 5 | 5 | 7 | 7 |
| η d(R) | 509 | 584 | 473 | 494 | 490 |
| $P_e$ (R) | 0.1 | 3 | 1 | 3 | 5 |

On each of these five substances were deposited two stacks A and B:

stack A: 15 nm of TiN, then 10 nm of TiO$_2$ and then 60 nm of SiOC, stack B: 5 nm of TiN, then 10 nm of TiO$_2$ and then 60 nm of SiOC The photometric results relating to the covered substrates of stack A are given in Table 7, indicating under each example No. the type of glass used:

TABLE 7

|  | Example 9 | Example 10 | Example 11 | Example 12 | Example 13 |
|---|---|---|---|---|---|
|  | clear | bronze | grey | green | blue |
| FS | 0.55 | 0.43 | 0.42 | 0.44 | 0.92 |
| $T_E$ | 45 | 27 | 24 | 28 | 49 |
| $T_L$ | 58 | 32 | 27 | 46 | 25 |
| $T_L/T_E$ | 1.29 | 1.19 | 1.12 | 1.69 | 1.93 |
| η d(t) | 498 | 582 | 481 | 494 | 491 |
| $P_e$ (t) | 1 | 8 | 3 | 6 | 8 |
| $R_L$ | 21 | 9 | 8 | 15.1 | 16.4 |
| η d(R) | 497 | 577 | 486 | 494 | 491 |
| $P_e$ (R) | 3 | 8 | 3 | 9 | 12 |

The photometric results concerning the covered substrates of stack B, in monolithic glazings, are given in Table 8, with the same conventions as hereinbefore.

TABLE 8

|  | Example 14 | Example 15 | Example 16 | Example 17 | Example 18 |
|---|---|---|---|---|---|
|  | clear | bronze | grey | green | blue |
| FS | 0.69 | 0.51 | 0.49 | 0.51 | 0.48 |
| $T_E$ | 61 | 37 | 33 | 36 | 61 |
| $T_L$ | 72 | 40 | 33 | 58 | 33 |
| $T_L/T_E$ | 1.17 | 1.08 | 1.01 | 1.59 | 1.87 |
| η d(t) | 500 | 583 | 478 | 494 | 491 |
| $P_e$ (t) | 1 | 8 | 2 | 5 | 8 |
| $R_L$ | 16 | 8 | 7 | 12 | 13 |
| η d(R) | 501 | 577 | 489 | 495 | 492 |
| $P_e$ (R) | 3 | 7 | 2 | 8 | 11 |

It is possible to deduce from the last series of examples a number of points. It can firstly be noted that the neutrality of the coloring in transmission of the stack of thin layers according to the invention permits the glass substrate to retain its original color in transmission. However, in reflection, the stack of thin layers can slightly modify the appearance of the blank glass substrate, whilst obtaining effects of the combination of the colors which can prove esthetic and original.

It should also be noted that the molar radiation filtering effects due on the one hand to the actual substrates and on the other to the thin layers, are combined in a particularly advantageous manner. It is thus possible to obtain new "compromises" between the light transmission and the energy transmission and therefore better adjust the performance characteristics of the glazings as a function of need, by diversifying the range of so-called solar control glazings whilst having the possibility of varying both the glass type of the substrate and the thickness of the nitride layer. The comparison of Tables 7 and 8 shows that, for identical substrates, the thickness of the TiN makes it possible to "regulate" the $T_L$ and therefore the requisite transparency level, so as to comply with needs and in particular take account of whether the substrate will be used as a monolithic glazing or whether it will form part of a multiple glazing of the double glazing type.

Thus, in conclusion, it is possible to modify both the anti-molar performance characteristics, the visual appearance and the oxidation resistance of the glazing by modifying the number and thicknesses of layers of the stack within given ranges of the substrate type, which permits the adaptation of the glazing to market needs.

No problems are encountered when producing such a stack on a float line, the first two deposits of the oxide or oxycarbide layer 2 and nitride layer 3 e.g. taking place by vapor phase pyrolysis in the downstream part of the float bath enclosure and the deposition of the $TiO_2$ oxide overlayer 4 taking place by liquid or solid pyrolysis between the float glass enclosures and the lehr, or by vapor pyrolysis just prior to the glass ribbon leaving the float bath enclosure and that of the second overlayer by vapor phase pyrolysis in the lehr.

Thus, the stack according to the invention provides an optimum protection of the functional metal nitride layer, whilst being industrially feasible. By combining it with filtering substrates, it is possible to optimize and diversify the glazings and their performance characteristics.

Obviously, additional modifications and variations of the present invention are possible in light of the above teachings. It is therefore to be understood that within the scope of the appended claims, the invention may be practiced otherwise than as specifically described herein.

This application is based on French Patent Application FR-93/13023 filed with the French Patent Office on Nov. 2, 1993, the entire contents of which are hereby incorporated by reference.

What is claimed as new and is desired to be secured by Letters Patent of the United States is:

1. A coated substrate comprising in sequential layers:
   (i) a transparent substrate;
   (ii) a metal nitride layer wherein said metal is largely titanium having a geometrical thickness of between 10 and 60 nm;
   (iii) a pyrolyzed metal oxide layer formed on a surface of said metal nitride layer wherein said metal is largely titanium having a geometrical thickness of from 10 to below 90 nm; and
   (iv) an anti-reflection layer having a refractive index below 2, on an external surface of said metal oxide layer.

2. The substrate of claim 1, wherein said metal nitride layer has a geometrical thickness of between 15 and 35 nm.

3. The substrate of claim 1, wherein said metal oxide layer has a geometrical thickness of between 10 and 30 nm.

4. The substrate of claim 1, further comprising a dielectric material layer located between said substrate and said metal nitride layer.

5. The substrate of claim 4, wherein said dielectric material layer has a refractive index of between 1.5 and 2 and has a geometrical thickness below 100 nm.

6. The substrate of claim 4, wherein said dielectric material layer has a refractive index of between 1.6 and 1.9 and has a geometrical thickness below 100 nm.

7. The substrate of claim 4, wherein said dielectric material layer has a geometric thickness of between approximately 40 to 90 nm.

8. The substrate of any one of claims 5 to 6, wherein said dielectric material layer has a geometrical thickness of from approximately 40 to 90 nm.

9. The substrate of claim 4, wherein said dielectric material layer is based on an oxide selected from the group consisting of silicon dioxide, silicon oxycarbide and a mixture thereof.

10. The substrate of claim 1, wherein said anti-reflection layer has a refractive index of from 1.6 to 1.9.

11. The substrate of claim 1, wherein said anti-reflection layer is based on an oxide selected from the group consisting of silicon dioxide, silicon oxycarbide and a mixture thereof.

12. The substrate of any one of claims 1 and 10, wherein said anti-reflection layer has a geometrical thickness below 200 nm.

13. The substrate of any one of claims 1 and 10, wherein said anti-reflection layer has a geometrical thickness of between 20 and 150 nm.

14. The substrate of any one of claims 1 and 10, wherein said anti-reflection layer has a geometrical thickness of between 40 and 70 nm.

15. The substrate of claim 1, wherein a sum of the geometrical thicknesses of said metal oxide layer and said anti-reflection layer is equal to approximately 40 to 80 wherein a thickness of said metal oxide layer is at least 10 nm.

16. The substrate of claim 1, wherein said sum of the geometrical thicknesses of said metal oxide layer and said anti-reflection layer is from 50 to 75 nanometers, 17. The substrate of claim 1, wherein said transparent substrate is selected from the group consisting of a clear glass substrate of the soda-lime-silica glass type, a glass substrate with a reduced energy transmission and a glass substrate with a reduced energy transmission in colored form.

18. A solar protection glazing, comprising the substrate of claim 1, wherein said glazing has a light transmission $T_L$ equal to or below 65% and a $T_L/T_E$ ratio between the light transmission $T_L$ and the energy transmission $T_E$ above 1.

19. The solar protection glazing of claim 18 wherein said $T_L/T_E$ ratio is between 1.2 and 1.4.

20. The solar protection glazing of claim 18 wherein said $T_L/T_E$ ratio is close to 1.3.

21. The solar protection glazing of claim 18, wherein said glazing is a multiple glazing.

22. The solar protection glazing of claim 18, wherein said glazing is a double glazing.

23. The solar protection glazing of claim 18, wherein said glazing is a monolithic glazing.

24. The solar protection glazing of claim 18, wherein said glazing has a solar factor of at the most 0.5.

* * * * *